(12) United States Patent
Strijker

(10) Patent No.: US 9,893,638 B1
(45) Date of Patent: Feb. 13, 2018

(54) SWITCHED MODE POWER SUPPLIES WITH ADAPTIVE REFERENCE VOLTAGE FOR CONTROLLING OUTPUT TRANSISTOR

(71) Applicant: NXP B.V., Eindhoven (NL)

(72) Inventor: Joan Wichard Strijker, Wijchen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/478,151

(22) Filed: Apr. 3, 2017

(51) Int. Cl.
*H02M 3/335* (2006.01)
*H02M 1/08* (2006.01)

(52) U.S. Cl.
CPC ....... *H02M 3/33592* (2013.01); *H02M 1/083* (2013.01)

(58) Field of Classification Search
CPC . H02M 2001/0003; H02M 2001/0012; H02M 2001/0025; H02M 3/22; H02M 3/315; H02M 3/335; H02M 3/33507; H02M 3/33515; H02M 3/33523; H02M 3/33538; H02M 3/33553; H02M 3/33576; H02M 3/33592; H02M 3/337
See application file for complete search history.

(56) References Cited

U.S. PATENT DOCUMENTS

| 5,946,207 | A | 8/1999 | Schoofs | |
|---|---|---|---|---|
| 7,636,249 | B2 * | 12/2009 | Hu | H02M 3/33592 363/127 |
| 9,742,288 | B2 * | 8/2017 | Balakrishnan .... | H02M 3/33507 |
| 9,768,703 | B2 * | 9/2017 | Yang ................. | H02M 3/33592 |
| 2004/0125621 | A1 * | 7/2004 | Yang ................. | H02M 3/33592 363/21.14 |
| 2013/0083566 | A1 * | 4/2013 | Gaknoki .......... | H02M 3/33515 363/21.17 |
| 2015/0124494 | A1 * | 5/2015 | Malinin ........... | H02M 3/33592 363/21.14 |
| 2015/0146457 | A1 | 5/2015 | Strijker | |
| 2017/0222569 | A1 * | 8/2017 | Choi ................ | H02M 3/33569 |

OTHER PUBLICATIONS

TEA1791AT GreenChip synchronous rectifier controller, Product Data Sheet, Rev. 01, 13 pages; Jun. 2010.
PSMN4R6-60PS N-channel 60 V, 4.6 mΩ standard level MOSFET in TO220, Product Data Sheet, Rev. 3, 14 pages; Apr. 18, 2012.

* cited by examiner

*Primary Examiner* — Emily P Pham
*Assistant Examiner* — Shahzeb K Ahmad

(57) ABSTRACT

Switched mode power supply (SMPS) with adaptive reference voltage for controlling an output transistor and method of operating the SMPS are described. The adaptive reference voltage is implemented using a timer that starts when the voltage on a conduction terminal of the output transistor reaches a reference voltage and stops when the current through the output transistor reaches zero. The voltage difference between a target voltage and a voltage accumulated when the timer was active is then sampled to produce a sampled voltage, which defines a new reference voltage if the accumulated voltage is not equal to the target voltage so that the reference voltage is adaptively adjusted in accordance with an operational characteristic of the output transistor.

20 Claims, 9 Drawing Sheets

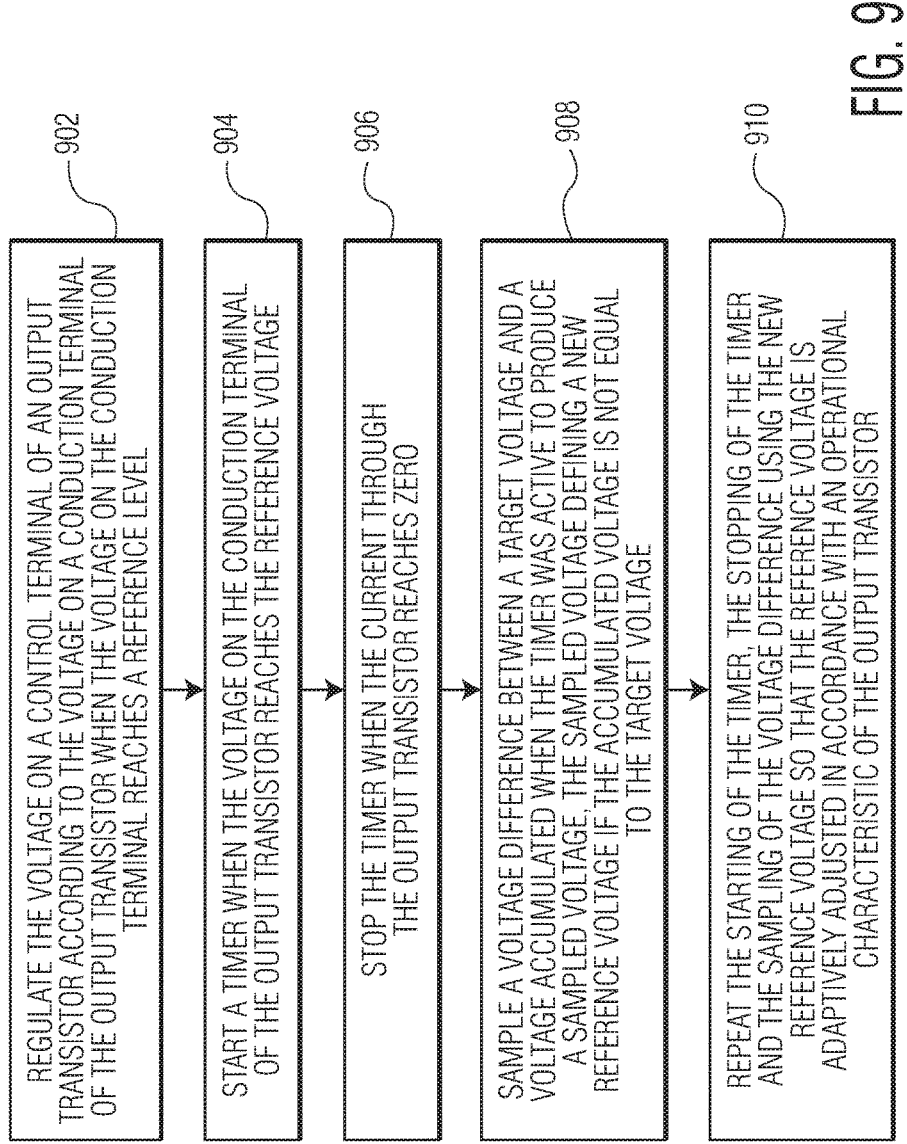

SWITCHED MODE POWER SUPPLIES WITH ADAPTIVE REFERENCE VOLTAGE FOR CONTROLLING OUTPUT TRANSISTOR Embodiments of the invention relate generally to switched mode power supplies and, more particularly, to synchronous rectification circuits for flyback switched mode power supplies.

Flyback switched mode power supplies are widely used to convert power from a source, such as mains power, to DC power supply for electronic devices, such as cellphones and tablets. Flyback switched mode power supplies use a transformer as the storage inductor, which provides isolation as well as the ability to adjust the output voltage. In flyback switched mode power supplies with a synchronous rectification (SR) metal-oxide-semiconductor field-effect transistor (MOSFET), proper timing of the SR MOSFET is important for high efficiency.

As efficiency demands increase, SR MOSFETs are chosen with lower drain-source on-resistance (RdsOn), which results in lower drain-source voltages across the SR MOSFET. However, the drain-source voltage across the SR MOSFET is typically used for timing, which becomes more difficult to control with a lower RdsOn. One approach to at least partially resolve this issue is by regulating the gate-source voltage of the SR MOSFET to a certain reference level. However, the reference level cannot be chosen too low because of offsets, which results in a non-optimal efficiency for SR MOSFETs with very low RdsOn.

SUMMARY

Switched mode power supply (SMPS) with adaptive reference voltage for controlling an output transistor and method of operating the SMPS are described. The adaptive reference voltage is implemented using a timer that starts when the voltage on a conduction terminal of the output transistor reaches a reference voltage and stops when the current through the output transistor reaches zero. The voltage difference between a target voltage and a voltage accumulated when the timer was active is then sampled to produce a sampled voltage, which defines a new reference voltage if the accumulated voltage is not equal to the target voltage so that the reference voltage is adaptively adjusted in accordance with an operational characteristic of the output transistor.

In an embodiment, an SMPS includes a transformer with a first winding and a second winding, the first winding being connected to an input node and the second winding connected to an output node, an input switch connected to the first winding of the transformer, an output transistor connected to the second winding of the transformer, and a control circuit connected to the output transistor. The control circuit includes a regulator configured to regulate the voltage on a control terminal of the output transistor according to the voltage on a conduction terminal of the output transistor when the voltage on the conduction terminal reaches a reference voltage, a timer configured to start when the voltage on the conduction terminal of the output transistor reaches the reference voltage and to stop when the current through the output transistor reaches zero, and a sampling circuit connected to the timer, the sampling circuit being configured to sample a voltage difference between a target voltage and a voltage accumulated when the timer was active to produce a sampled voltage, the sampled voltage defining a new reference voltage if the accumulated voltage is not equal to the target voltage, wherein the control circuit is configured to operate in cycles using the latest reference voltage so that the reference voltage is adaptively adjusted in accordance with an operational characteristic of the output transistor.

In an embodiment, the control circuit further includes an amplifier that receives the accumulated voltage and the target voltage to produce the voltage difference.

In an embodiment, the control circuit further includes a second amplifier that receives the sampled voltage and a combined voltage of an offset voltage and the voltage on the conduction terminal of the output transistor to determine when the voltage on the conduction terminal of the output transistor reaches the reference voltage.

In an embodiment, the control circuit further comprises a comparator that compares the voltage on the control terminal of the output transistor with a predefined voltage to determine when the voltage on the control terminal of the output transistor drops below the predefined voltage.

In an embodiment, the control circuit further comprises a logic circuit that outputs a control signal in response to an output signal of the comparator to begin sampling the voltage difference between the target voltage and the accumulated voltage.

In an embodiment, the control circuit further comprises a delay timer circuit that delays the output signal of the comparator to produce a delayed signal of the output of the comparator, the delay signal being to stop the sampling of the voltage difference between the target voltage and the accumulated voltage.

In an embodiment, the timer includes a current source and a timer capacitor separated by a switch, which controls the timer.

In an embodiment, the control circuit further comprises a series-connected resistor and capacitor connected to the conduction terminal of the output transistor to filter the voltage on the conduction terminal of the output transistor.

In an embodiment, the output transistor is a metal-oxide-semiconductor field-effect transistor (MOSFET).

In an embodiment, a method of operating an SMPS includes regulating the voltage on a control terminal of an output transistor according to the voltage on a conduction terminal of the output transistor when the voltage on the conduction terminal reaches a reference voltage, the output transistor being connected to a winding of a transformer that is connected to an output node, starting a timer when the voltage on the conduction terminal of the output transistor reaches the reference voltage, stopping the timer when the current through the output transistor reaches zero, sampling a voltage difference between a target voltage and a voltage accumulated when the timer was active to produce a sampled voltage, the sampled voltage defining a new reference voltage if the accumulated voltage is not equal to the target voltage, and repeating the starting of the timer, the stopping of the timer and the sampling of the voltage difference using the new reference voltage so that the reference voltage is adaptively adjusted in accordance with an operational characteristic of the output transistor.

In an embodiment, the method further comprises receiving the accumulated voltage and the target voltage at an amplifier to produce the voltage difference.

In an embodiment, the method further comprises receiving the sampled voltage to a combined voltage of an offset voltage and the voltage on the conduction terminal of the output transistor at a second amplifier to determine when the voltage on the conduction terminal of the output transistor reaches the reference voltage.

In an embodiment, the method further comprises comparing the voltage on the control terminal of the output transistor with a predefined voltage using a comparator to determine when the voltage on the control terminal of the output transistor drops below the predefined voltage.

In an embodiment, the method further comprises using an output of the comparator to begin the sampling of the voltage difference between the target voltage and the accumulated voltage.

In an embodiment, the method further comprises delaying the output of the comparator using a delay timer circuit to use a delayed signal of the output of the comparator to stop the sampling of the voltage difference between the target voltage and the accumulated voltage.

In an embodiment, the starting and stopping the timer includes selectively connecting a current source to a timer capacitor using a switch.

In an embodiment, the method further comprises filtering the voltage on the conduction terminal of the output transistor using a resistor and a capacitor connected in series.

In an embodiment, an SMPS includes a transformer with a first winding and a second winding, the first winding being connected to an input node and the second winding connected to an output node, an input transistor connected to the first winding of the transformer, an output transistor connected to the second winding of the transformer, and a control circuit connected to the output transistor. The control circuit includes a regulator configured to regulate the voltage on a control terminal of the output transistor according to the voltage on a conduction terminal of the output transistor when the voltage on the conduction terminal reaches a reference voltage, a timer configured to start when the voltage on a conduction terminal of the output transistor reaches a reference voltage and to stop when the current through the output transistor reaches zero, a sampling circuit connected to the timer, the sampling circuit including an amplifier configured to produce a voltage difference between a target voltage and a voltage accumulated when the timer was active, the sampling circuit being configured to sample the voltage difference to produce a sampled voltage, the sampled voltage defining a new reference voltage if the accumulated voltage is not equal to the target voltage, wherein the control circuit is configured to operate in cycles using the latest reference voltage so that the reference voltage is adaptively adjusted in accordance with an operational characteristic of the transistor.

In an embodiment, the control circuit further includes a second amplifier that receives the sampled voltage and a combined voltage of an offset voltage and the voltage on the conduction terminal of the output transistor to determine when the voltage on the conduction terminal of the transistor reaches the reference voltage.

In an embodiment, the control circuit further comprises a comparator that compares the voltage on the control terminal of the output transistor with a predefined voltage to determine when the voltage on the control terminal of the output transistor drops below the predefined voltage.

Other aspects and advantages of embodiments of the present invention will become apparent from the following detailed description, taken in conjunction with the accompanying drawings, depicted by way of example of the principles of the invention.

BRIEF DESCRIPTION OF THE DRAWINGS

FIG. 9 is a process flow diagram of a method of operating a SMPS in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
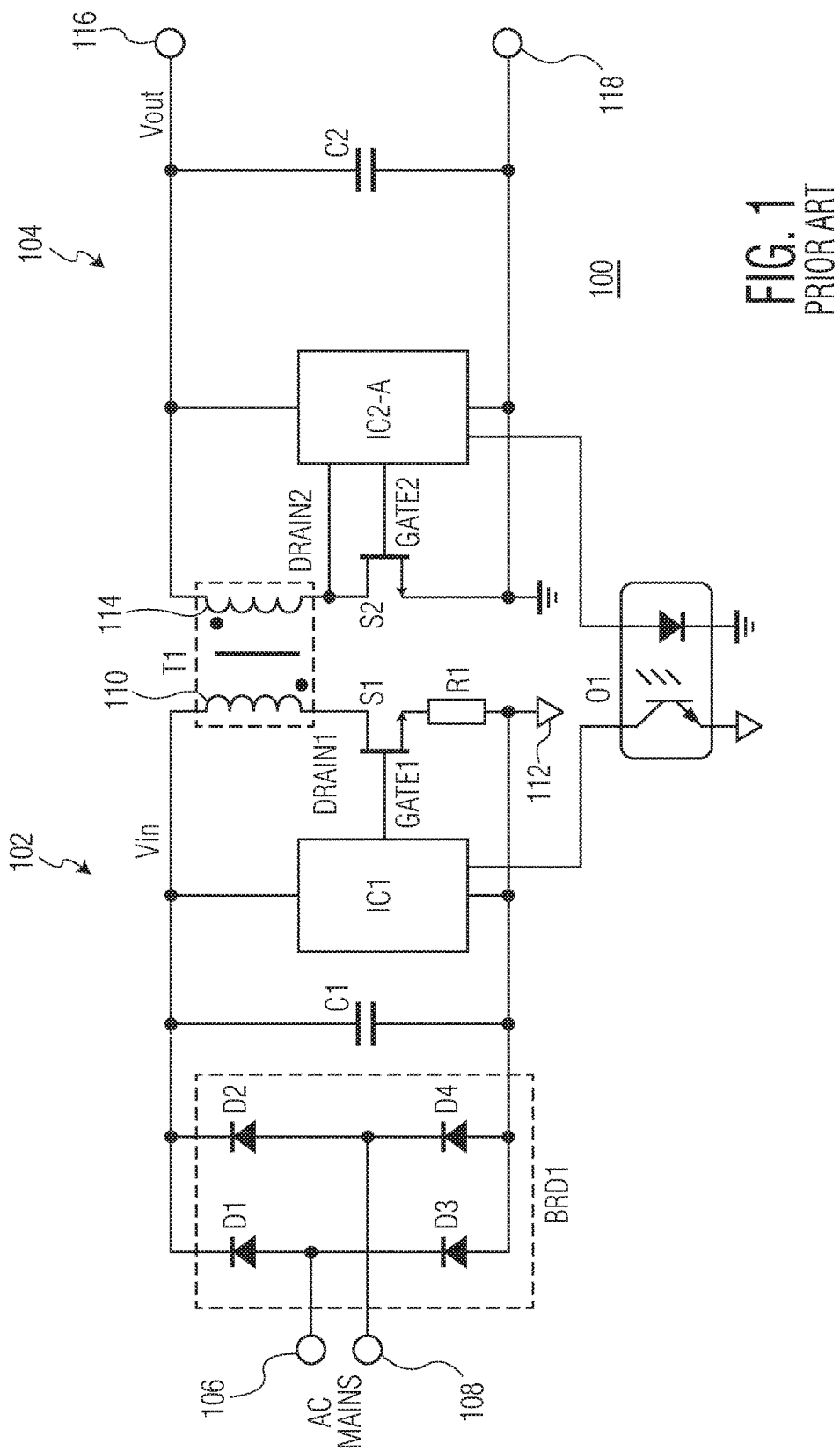
FIG. 1 is a circuit diagram of a SMPS in accordance with prior art.

FIG. 1 is a diagram of a switched mode power supply (SMPS) 100 in accordance with prior art. The SMPS 100 may be used for various power supply applications, such as a power supply for small electronic devices, e.g., cell phones, tablets and laptops. As shown in FIG. 1, the SMPS 100 includes a primary or input side 102 and a secondary or output side 104 that are isolated from each other via a transformer T1 and an optical coupler O1.

The input side 102 of the SMPS 100 includes a bridge rectifier diode BRD1, an input capacitor C1, a first control circuit IC1, a first switch S1 and a resistor R1. The bridge rectifier diode BRD1 is made up of four diodes D1, D2, D3 and D4, which are connected to AC mains via a pair of input nodes 106 and 108. The bridge rectifier diode BRD1 is connected to the input capacitor C1. Thus, the AC mains is connected to the input capacitor C1 via the bridge rectifier diode BRD1.

The first control circuit IC1 is configured to drive the first switch S1, which can be a transistor with a control terminal (e.g., gate) and conduction terminals (e.g., source and drain) such as a metal-oxide-semiconductor field-effect transistor (MOSFET), as shown in FIG. 1. The MOSFET S1 is connected to the primary winding 110 of the transformer T1 and connected to a common node 112, which may be ground, via the resistor R1. In an embodiment, the first control circuit IC1 may be a known integrated circuit (IC) used to control a switch on the input side of a conventional flyback switched mode power supply. As an example, the first control circuit IC may be an IC found in TEA1836 or TEA1755 sold by NXP Semiconductors.

The output side 104 of the SMPS 100 includes an output capacitor C2, a second control circuit IC2-A and a second switch S2. The output capacitor C2 is connected to the secondary winding 114 of the transformer T1 and ground. The second control circuit IC2-A is configured to drive the second switch S2, which can be a transistor with a control terminal (e.g., gate) and conduction terminals (e.g., source and drain). In the illustrated embodiment, the second switch S2 is a synchronous rectifier (SR) MOSFET. The SR MOSFET S2 is connected to the secondary winding 114 of the transformer T1 and connected to ground.

In operation, energy from the input side 102 is transferred to the output capacitor C2 via the transformer T1 using the SR MOSFET S2. The second control circuit IC2-A is configured to drive the SR MOSFET S2, and provide feedback to the first control circuit IC1 via the optocoupler O1 to control the output voltage across output nodes 116 and 118. In an embodiment, the second control circuit IC2-A may be a known IC used to control a switch in the output side of a conventional flyback switched mode power supply. As an example, the second control circuit IC2-A may be an IC found in TEA1791 or TEA1795 sold by NXP Semiconductors.

Figure 2:
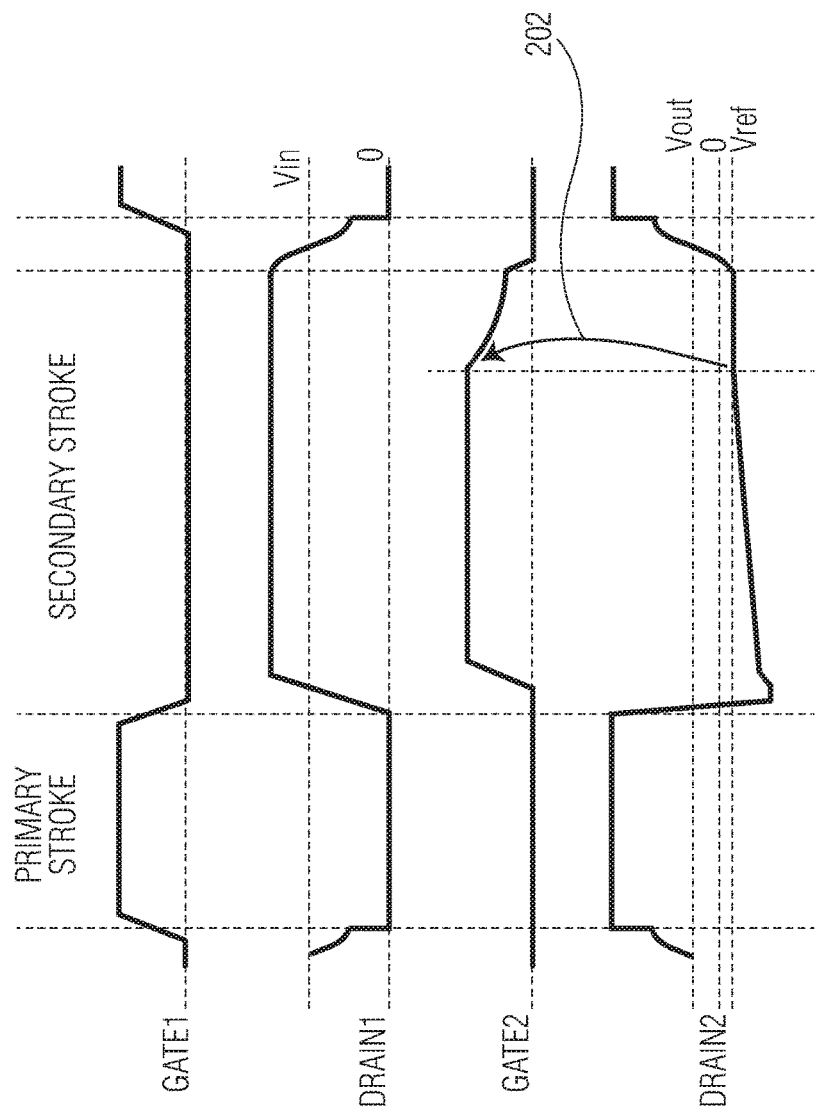
FIG. 2 is a signal diagram of the SMPS depicted in FIG. 1 in accordance with prior art.

A signal diagram for the operation of the SMPS 100 is shown in FIG. 2. During the primary stroke, the gate (gate1) of the MOSFET S1 is set high by the first control circuit IC1, which turns on the MOSFET S1. However, the gate (gate2) of the SR MOSFET S2 is set low by the second control circuit IC2-A, which turns off the SR MOSFET S2. During the primary stroke, energy is stored in the transformer T1. During the secondary stroke, the gate of the SR MOSFET S2 is set high by the second control circuit IC2-A, which turns on the SR MOSFET S2. As soon as the signal on the drain (drain2) of the SR MOSFET S2 reaches a reference voltage (Vref), the voltage on the gate of the SR MOSFET S2 is reduced, as indicated by the arrow 202 in FIG. 2, by a regulating circuit in the second control circuit IC2-A, such that the signal on the drain (drain2) of the SR MOSFET S2 is regulated to the reference voltage. At the end of the secondary stroke, the voltage on the gate of the SR MOSFET S2 is essentially at the threshold voltage of SR MOSFET S2 (for example, +/−5% of the threshold voltage). In particular, at the end of the secondary stroke, the current through the SR MOSFET S2 reaches zero. The SMPS regulates the gate voltage such that the drain-source voltage is constant. With the current reaching zero, the gate voltage reaches its threshold voltage. The second control circuit IC2-A uses a closed loop regulation, so if the threshold voltage changes due to temperature or MOSFET process variations, the second control circuit will regulate to the new threshold voltage. The MOSFET formula, when in saturation, is $Ids = k*(Vgs - Vth)^2$. So when Ids reaches zero, Vgs will reach Vth. In this state, the SR MOSFET S2 can be turned off quickly. The energy stored in the transformer T1 during the primary stroke is transferred to the output side 104 during the secondary stroke.

Figure 3:
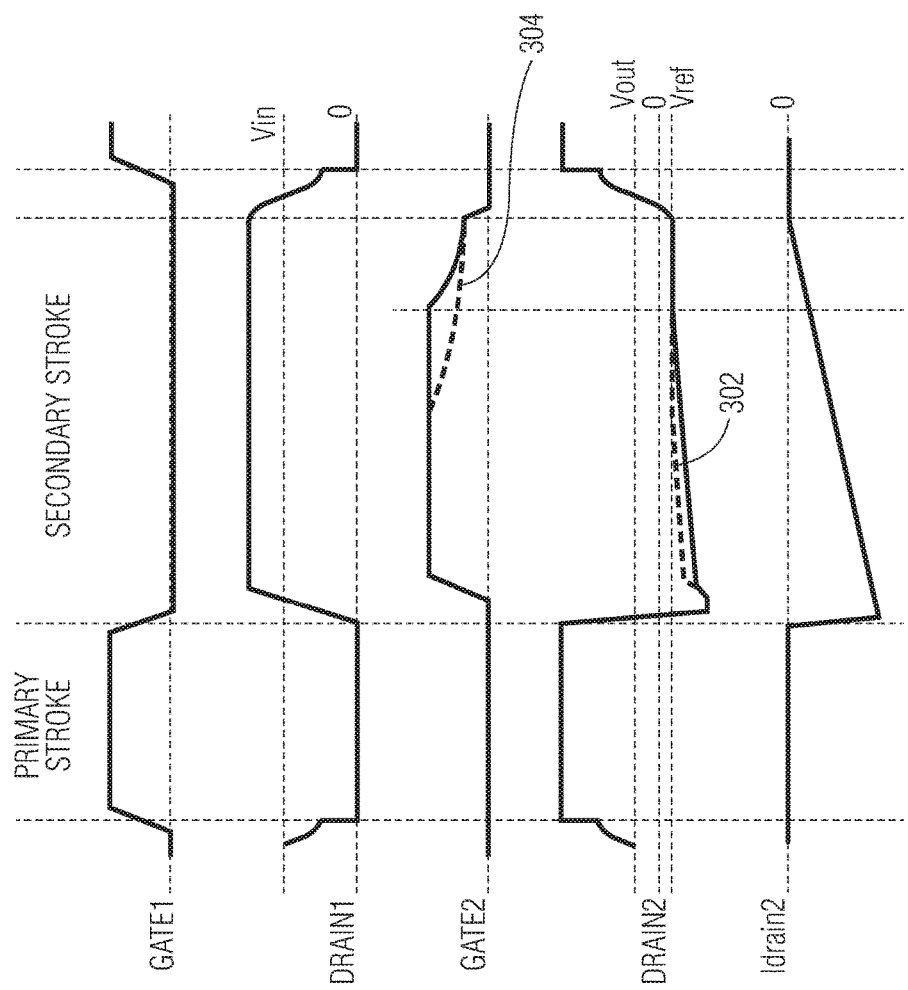
FIG. 3 is a signal diagram of the SMPS depicted in FIG. 1 with a high RdsOn SR MOSFET and with a low RdsOn (dotted line) SR MOSFET in accordance with prior art.

When an SR MOSFET is chosen with a lower drain-source on-resistance (RdsOn) for the SR MOSFET S2 to improve the efficiency of the SMPS 100, the reference voltage level will be reached at an earlier point. The gate voltage of the SR MOSFET will therefore be regulated down at an earlier point, which is illustrated in a signal diagram of FIG. 3. In FIG. 3, the signals of FIG. 2 are repeated and the signals for a lower RdsOn MOSFET that differ from the signals of FIG. 2 are drawn in dashed lines 302 and 304. The dashed line 302 shows that the signal on the drain (drain2) of the SR MOSFET S2 will reach the reference voltage (Vref) at an earlier time. The dashed line 304 shows that the gate voltage of the SR MOSFET S2 will be regulated down at an earlier time as a result of the drain signal reaching the reference voltage earlier.

Since the SR MOSFET drain-source is regulated to a fixed reference voltage, the conduction losses are only minimally reduced when a more low-ohmic MOSFET is used for the SR MOSFET S2. One way to further reduce the conduction losses is to choose the reference voltage Vref closer to zero. However, offset in the regulation circuit requires that the reference voltage Vref to be significantly away from zero.

Figure 4:
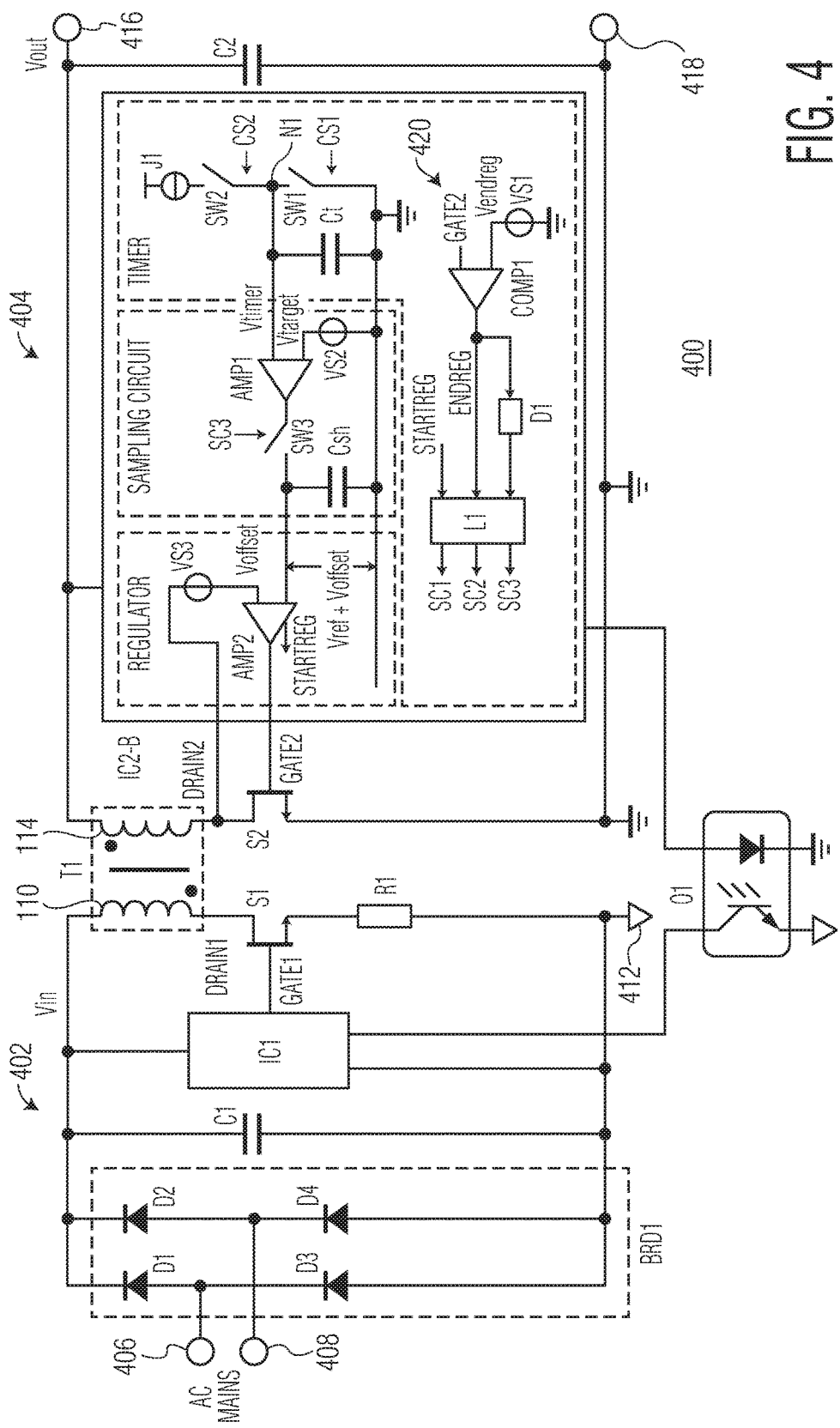
FIG. 4 is a circuit diagram of a SMPS in accordance with an embodiment of the invention.

FIG. 4 is a diagram of an SMPS 400 in accordance with an embodiment of the invention. As explained below, the SMPS 400 is designed to overcome the reference voltage limitation explained above. The SMPS 400 may be used for various power supply applications, such as a power supply for small electronic devices, e.g., cell phones, tablets and laptops. The SMPS 400 includes similar components as the SMPS 100. Thus, in FIG. 4, components in the SMPS 400 that are similar to the components of the SMPS 100 are referenced using similar reference characters/numbers. As shown in FIG. 4, the SMPS 400 includes a primary or input side 402 and a secondary or output side 404 that are isolated from each other via the transformer T1 and the optical coupler O1.

The input side 402 of the SMPS 400 includes the bridge rectifier diode BRD1, the input capacitor C1, the first control circuit IC1, the first switch S1 and the resistor R1. The bridge rectifier diode BRD1 is made up of the four diodes D1, D2, D3 and D4, which are connected to AC mains via a pair of input nodes 406 and 408. The bridge rectifier diode BRD1 is connected to the input capacitor C1. Thus, the AC mains is connected to the input capacitor C1 via the bridge rectifier diode BRD1.

The first control circuit IC1 is configured to drive the first switch S1, which can be a transistor with a control terminal (e.g., gate) and conduction terminals (e.g., source and drain) such as a MOSFET, as shown in FIG. 4. The MOSFET S1 is connected to the primary winding 110 of the transformer T1 and connected to a common node 412, which may be ground, via the resistor R1.

The output side 404 of the SMPS 400 includes the output capacitor C2, a second control circuit IC2-B and the second switch S2. The output capacitor C2 is connected to the secondary winding 114 of the transformer T1 and ground. The second control circuit IC2-B is configured to drive the second switch S2, which can be a transistor with a control terminal (e.g., gate) and conduction terminals (e.g., source and drain). In the illustrated embodiment, the second switch S2 is an SR MOSFET. The SR MOSFET S2 is connected to the secondary winding 114 of the transformer T1 and connected to ground. The second control circuit IC2-B is configured to drive the SR MOSFET S2, and provide feedback to the first control circuit IC1 via the optocoupler O1 to control the output voltage across output nodes 416 and 418. In particular, the second control circuit IC2-B is configured to control the SR MOSFET S2 such that efficiency is not lost due to the reference voltage limitation, as explained above with respect to the SMPS 100. The second control circuit IC2-B is described in more detail below.

In order to overcome the reference voltage limitation of the SMPS 100, the second control circuit IC2-B of the SMPS 400 is configured to regulate the reference voltage, Vref, to a value such that regulation time, Treg, which is defined herein as the time in which the gate voltage for the SR MOSFET S2 is reduced near to its threshold voltage, is regulated to a predefined shortened time period. As explained below, the reference voltage is regulated in a closed loop, and thus, the offset of the reference voltage amplifier is cancelled by the closed loop. With this embodiment, there is almost no limit anymore to how close the reference voltage can be to zero. The limit is only set by the gate voltage discharge capability of the driver stage for the SR MOSFET S2, which will be explained further below.

Figure 5:
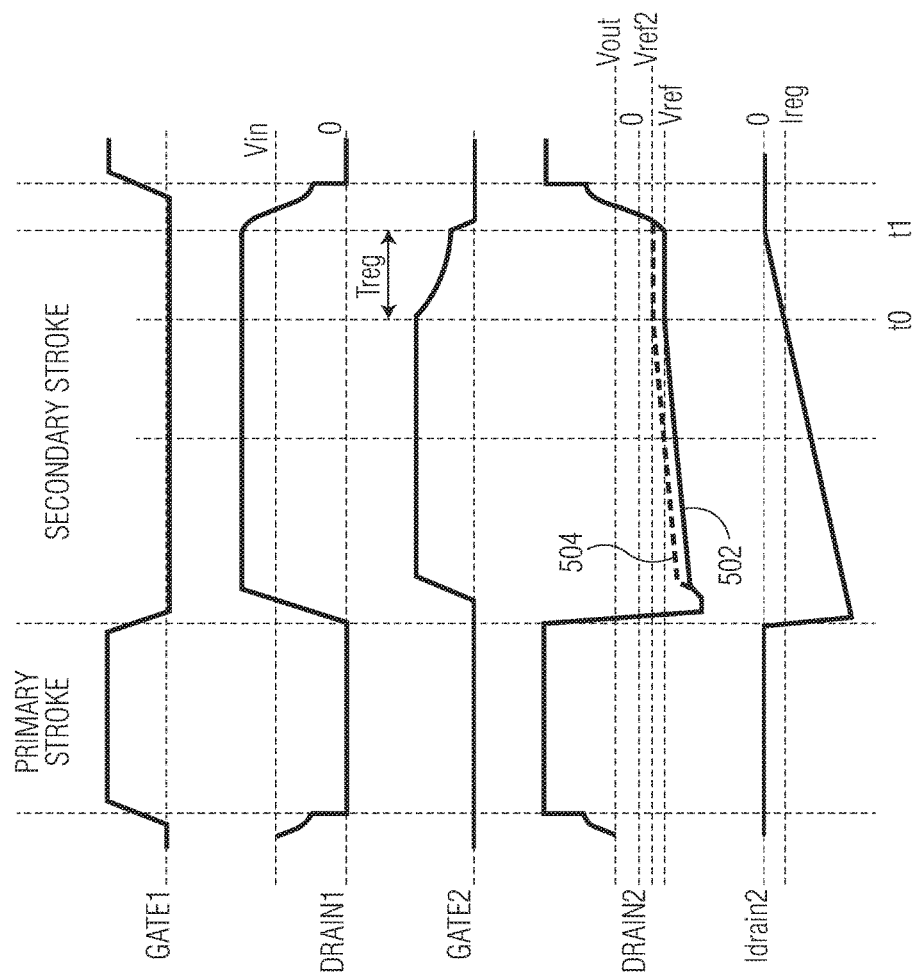
FIG. 5 is a signal diagram of the SMPS depicted in FIG. 4 with a high RdsOn SR MOSFET and with a low RdsOn SR MOSFET in accordance with an embodiment of the invention.

Turning now to FIG. 5, a signal diagram of the SMPS 400 with a high RdsOn SR MOSFET (e.g., RdsOn=8 milliohms) and with a low RdsOn SR MOSFET (e.g., RdsOn=2 milliohms) in accordance with an embodiment of the invention is shown. The only difference between the signals for the high RdsOn SR MOSFET and the signals for the low RdsOn SR MOSFET is the signals on the drain (drain2) of the SR MOSFET S2. The reference voltage for the drain 2 signal of the high RdsOn SR MOSFET is regulated to a first reference voltage Vref1, as indicated by a solid line 502. The reference voltage for the drain 2 signal of the low RdsOn SR MOSFET is regulated to a second reference voltage Vref2, as indicated by a dotted line 504, which is closer to zero than the first reference voltage Vref1. The second reference voltage Vref2 is regulated so that the regulation time, Treg, which is shown in FIG. 5 as t0 to t1, is same for both the high and low RdsOn SR MOSFETs.

With the SMPS 400, the drain-source voltage drop is smaller during the entire secondary stroke for the low ohmic SR MOSFET. As such, the conduction losses are smaller and so the efficiency of the SMPS 400 will be higher.

The regulation voltage can be calculated as:

$$di/dt = Vout/Ls,$$

where di/dt is the current change of the drain current Idrain2 with time, Vout is the output voltage of the SMPS 400, and Ls is the inductance of the output winding of transformer T1.

The second control circuit IC2-B of the SMPS 400 operates to regulate the regulation time, Treg. At the point where the regulation starts (t=t0):

$$di/dt = -Ireg/Treg,$$

where Treg is the drain current at the moment the regulation starts (t=t0) and −Ireg/Treg=Vout/Ls or Ireg=−Vout/Ls*Treg. In regulation:

$$Vref = Ireg*RdsOn,$$

where RdsOn is the on-state resistance of the MOSFET, so:

$$Vref = -Vout/Ls*Treg*RdsOn.$$

Turning back to FIG. 4, the second control circuit IC2-B includes a control signal generator 420, which generates three switch control signals, sc1, sc2 and sc3. The control signal generator 420 includes a comparator COMP1 that compares the signal on the gate (gate2) of the SR MOSFET S2 and a voltage Vendreg generated by a voltage source VS1, and outputs an endreg signal. The endreg output signal from the comparator COMP1 is transmitted to a logic circuit L1 directly and via a delay timer circuit D1. In addition to the endreg signal and the delayed endreg signal, the logic circuit L1 also receives a startreg signal, which is described below. The logic circuit L1 outputs the three switch control signals, sc1, sc2 and sc3, in response to the received signals.

The second control circuit IC2-B further includes a current source J1 that is connected to ground via two switches SW1 and SW2, which are controlled by the switch control signals sc1 and sc2, respectively. These switches SW1 and SW2 may be transistors, such as MOSFETs. Situated between the switches SW1 and SW2 is a node N1, which is connected to an input of an amplifier AMP1. The other input of the amplifier AMP1 is connected to a voltage source VS2, which is connected to ground and generated a voltage Vtarget. A timer capacitor Ct is also connected to the node N1 and to ground. The current source J1, the timer capacitor Ct, the switches SW1 and SW2, and the control signal generator 420 form a timer, which can be started and stopped using the cs1 and cs2 signals on the switches SW1 and SW2, respectively.

The output of the amplifier AMP1 is connected to an input of an amplifier AMP2 via switch SW3. The same input of the amplifier AMP2 is also connected to a sample and hold capacitor Csh, which is connected to ground. The amplifier AMP1, the voltage source VS2, the capacitor Csh and the switch SW3 form a sampling circuit, which is controlled by the sc3 signal on the switch SW3. The other input of the amplifier AMP2 is connected to a voltage source VS3, which generates a voltage Voffset. The output of the amplifier AMP2 is connected to the gate of the SR MOSFET S2, and thus, drives the SR MOSFET. The output of the amplifier AMP2 is also connected to the logic circuit L1 of the control signal generator 420 to provide the startreg signal, when a regulation time begins. The amplifier AMP2 and the voltage source VS3 form a regulator, which regulates the voltage on the gate of the SR MOSFET S2.

Figure 6:
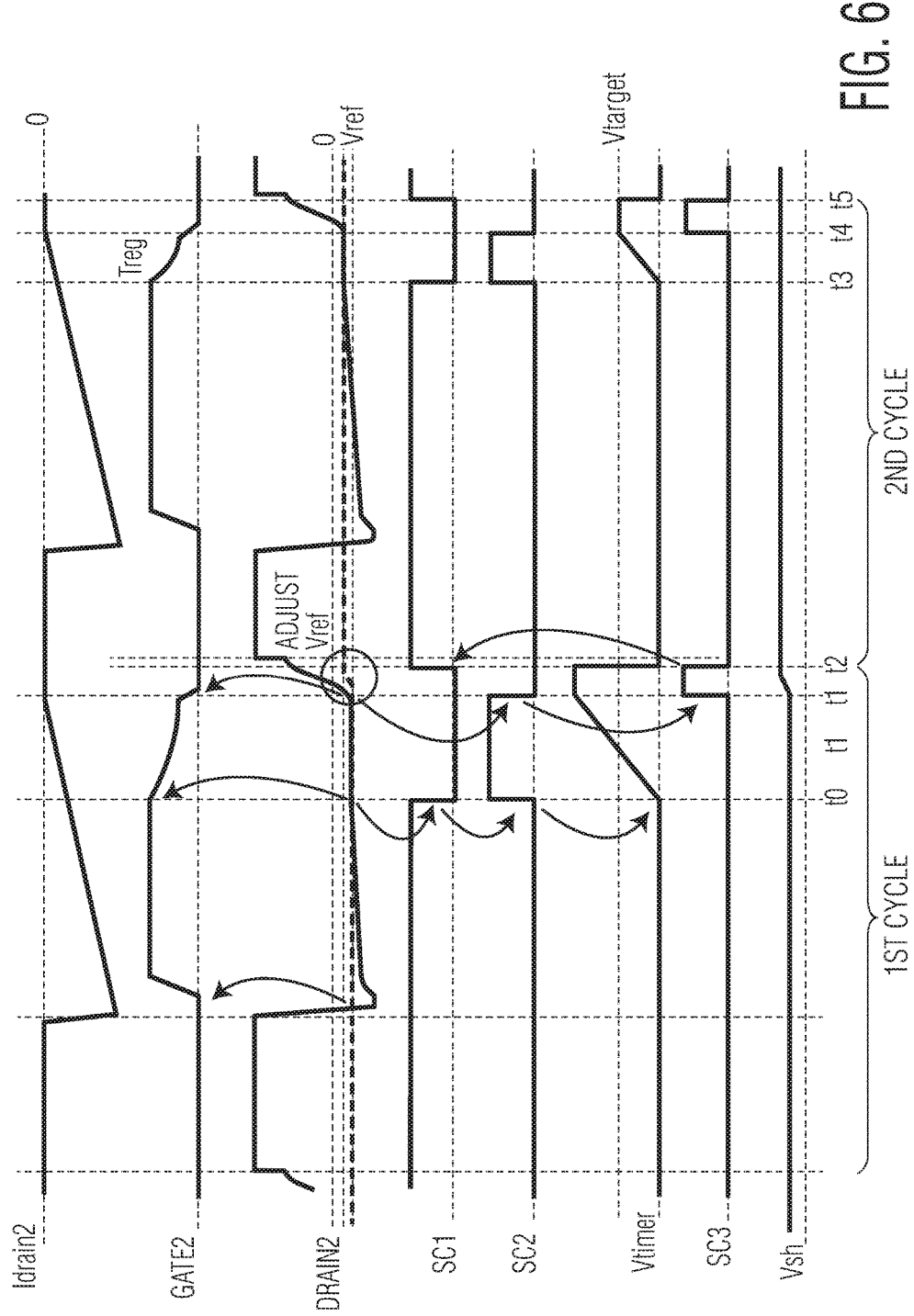
FIG. 6 is a timing diagram of the SMPS depicted in FIG. 4 in accordance with an embodiment of the invention.

Turning now to FIG. 6, a timing diagram of the SMPS 400 in accordance with an embodiment of the invention is shown. At t=t0, the voltage on the drain (drain2) of the SR MOSFET S2 voltage reaches the reference voltage Vref. The voltage on the gate (gate2) of the SR MOSFET S2 is then regulated down by the amplifier AMP2 such that the drain2 voltage remains at the reference voltage Vref. Also at t=t0, a timer is started using the current source J1 and the capacitor Ct. Specifically, the switch SW2 is closed by the sc2 signal and the switch SW1 is opened at the same time by the sc1 signal. The sc1 and sc2 signals are provided by the logic circuit L1. The time t0 is reached when the amplifier AMP2 starts regulating down the gate2 voltage. When the regulation starts, the amplifier AMP2 outputs the startreg signal, which is an additional signal, to the logic circuit L1. In response to the startreg signal, the logic circuit generates the sc1 and sc2 signals.

At t=t1, the current on the drain (Idrain2) of the SR MOSFET S2 reaches zero and the gate2 voltage is reduced to switch off the SR MOSFET S2. Also at t=t1, the voltage ramp on the timer capacitor Ct is stopped and a sample of the voltage difference of the accumulated voltage on the capacitor Ct and the target voltage Vtarget provided by the voltage source V2 is taken during the time interval t1-t2. This voltage difference is the output of the amplifier AMP1. The sample switch SW3 is controlled by the sc3 signal provided by the logic circuit L1, which opens the sample switch SW3 during the time interval t1-t2.

At t=2, an endreg signal is generated by the comparator COMP1 and transmitted to the logic circuit L1. The endreg signal is high when the gate2 voltage drops below the Vendreg voltage (at t=t1). The Vendreg voltage is set at a voltage below the threshold voltage of the SR MOSFET S2. The Vendreg voltage is not critical since at the end of the secondary stroke, the gate2 voltage drops from the threshold voltage to zero quickly. As an example, the Vendreg voltage may be set at 50% of the typical minimum threshold voltage (minimum with respect to MOSFET process variations). So for a MOSFET with a minimum threshold voltage of 1.5 V, the Vendreg voltage may be set at 0.75 V. The time t2 is defined by the delay timer circuit D1.

In the first cycle, the peak voltage on the capacitor Ct is larger than the target voltage Vtarget, and thus, the regulation time interval Treg (i.e., t0-t1) is too long. During the sampling time interval t1-t2, the sample and hold voltage Vsh is adjusted. As a result, for the next cycle, the reference voltage is higher.

In the next cycle at t=t3, the timer is started again on the new reference voltage. At t=t4, the drain current Idrain2 reaches zero again and the ramp on the capacitor Ct is stopped. Now, the peak voltage of the time voltage Vtimer is equal to the target value, i.e., Vtarget. Thus, the second control circuit IC2-B is in its stable regulation point and regulated to the correct reference voltage (Vref) level such that the regulation time interval t3-t4 is on its Treg target.

In FIG. 6, the stable regulation is reached in one cycle. For a practical implementation, this will take several cycles at the start-up of the SMPS 400. Once in regulation, the regulation only needs to adjust for threshold voltage shift and RdsOn shift due to temperature variations. These variations are typically very slow compared to the switching frequency of the SMPS 400. The regulations do not need to adjust its control in case of (fast) load variations, which will make the secondary stroke longer or shorter, because the di/dt of the drain current Idrain2 does not change and the signals from the time interval t3-t5 remain the same.

The target regulation time, Treg, is defined by the target voltage Vtarget, the current source J1 and the timer capacitor Ct, as follows:

$$Treg=Ct*Vtarget/I(J1),$$

where Treg is the target regulation time, Ct is capacitance value of the timer capacitor Ct, Vtarget is the target timer voltage and I(J1) is the current of the current source J1.

As typically only a positive supply voltage is present in SR controller ICs, an offset voltage, Voffset, has been added to the second control circuit IC2-B. If the minimum reference voltage Vref is, for example, −50 mV, the offset voltage can be chosen to be +100 millivolts (mV). The second control circuit IC2-B will then regulate the sample and hold voltage Vsh to Vref+Voffset=+50 mV. For low ohmic MOSFETs, the reference voltage will be close to zero, so the Vsh voltage will be close to +100 mV when in regulation.

At start-up of the SMPS 400, if the second control circuit IC2-B is started from a zero Vsh voltage, the regulation time then starts with a value longer than the target regulation time and the amplifier AMP2 is always able to discharge the gate2 voltage fully at the end of the secondary stroke.

If an offset exists in the amplifier AMP2, the second control circuit IC2-B just regulates to a different Vsh voltage to compensate the offset, as follows: Vsh=Vref+Voffset+Voffset(AMP2). The second control circuit IC2-B will regulate/adjust the Vsh voltage such that, in the stable situation, the condition Treg=Ct*Vtarget/I(J1) is satisfied, which is a significant advantage of the SMPS 400. The Vref reference can be smaller than the offset voltage of the amplifier AMP2. This enables very low ohmic MOSFETs to be used in the SMPS 400 with low conduction losses and high efficiency.

In the SMPS 400, the reference voltage can be very close to zero. As explained above, Vref=−Vout/Ls*Treg*RdsOn. So, if the regulation time Treg is chosen to be a low value, the reference voltage Vref will be closer to zero. A limit to how short the regulation time Treg can be depends on the sink capability of the amplifier AMP2, which must be able to discharge the gate of the SR MOSFET S2 within the target regulation time. For example, for the PSMN4R6-60PS MOSFET (commercially available from Nexperia), the gate charge is 63 nanocoulombs (nC). If the regulation time Treg is chosen at 500 nanoseconds (nsec), the amplifier AMP2 must be able to sink 63 nC/500 nsec=126 mA. In a 5V application with Ls=2 microhenries (μH) and RdsOn=4.6 milliohms (mohm), the reference voltage will be: −Vout/Ls*Treg*RdsOn=−5V/2 μH*500 nsec*4.6 mohm=−5.8 mV. As a comparison: for the TEA1791, the reference voltage is −55 mV, which is about 10 times larger.

Figure 7:
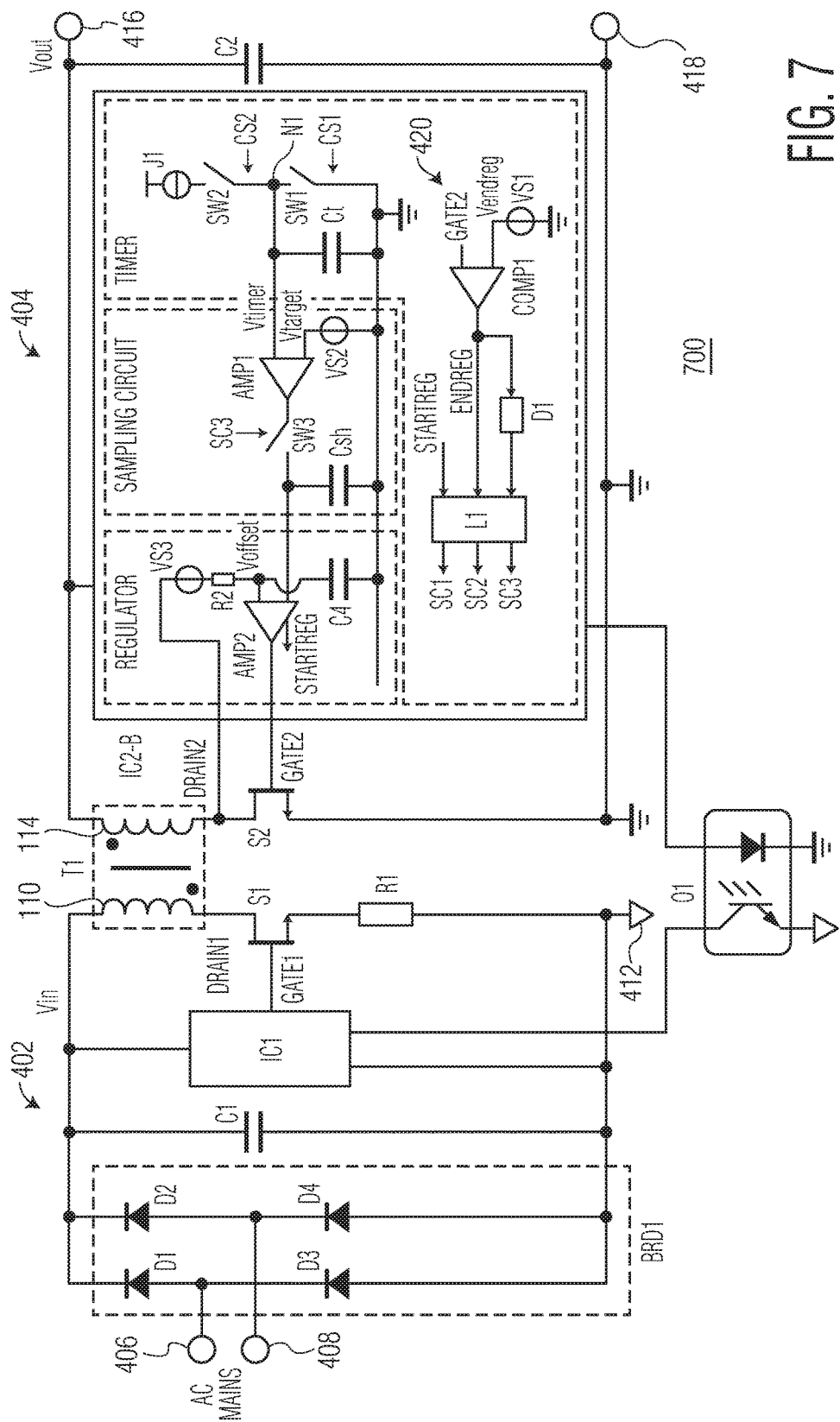
FIG. 7 is a diagram of an SMPS with filtering in accordance with an embodiment of the invention.

In an embodiment, filtering can be added in the second control circuit IC2-B for ringing, which is typically present on the drain current of the SR MOSFET S2. FIG. 7 is a diagram of an SMPS 700 with filtering in accordance with an embodiment of the invention. The SMPS 700 includes the same components as the SMPS 400. However, in SMPS 700, the second control circuit IC2-B includes a filtering resistor R2 and a filtering capacitor C4 that are connected in series between the voltage source VS3 and ground.

Figure 8:
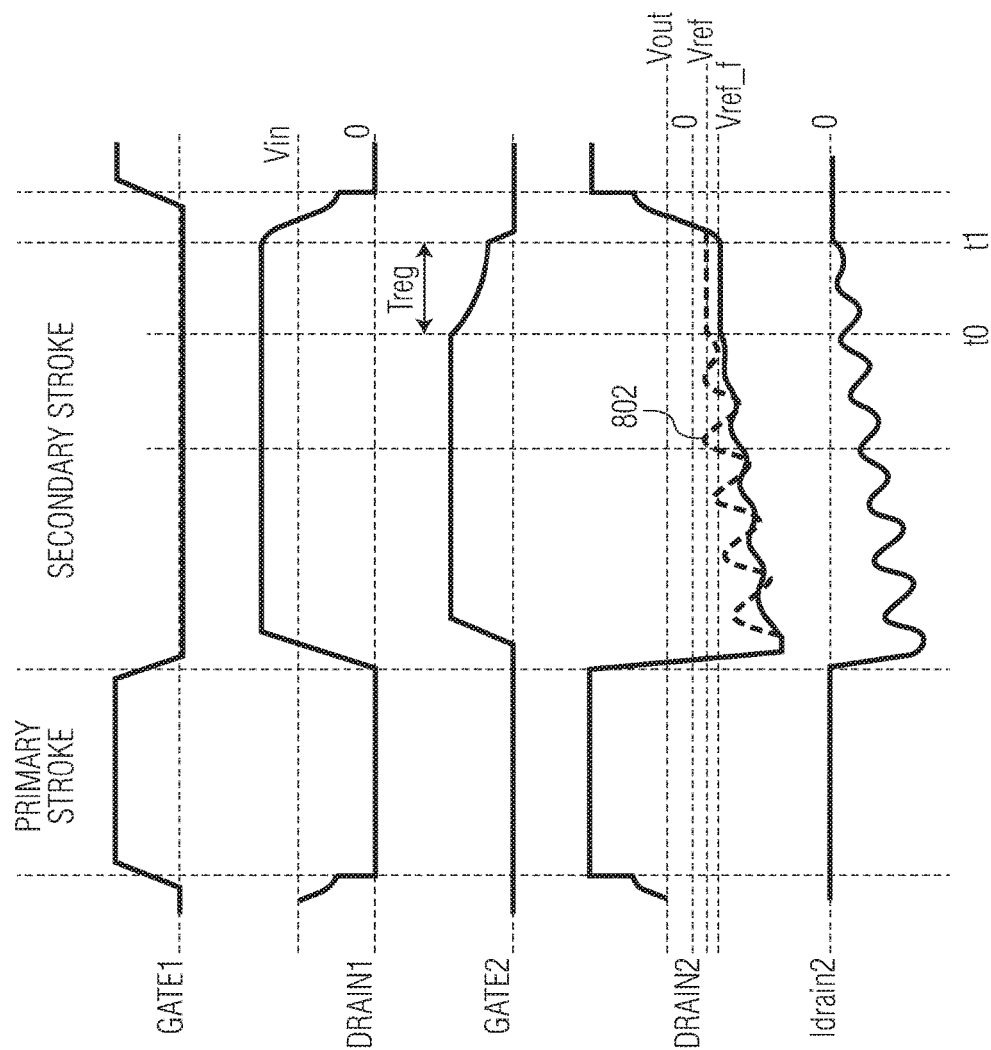
FIG. 8 is a signal diagram of the SMPS depicted in FIG. 7 in accordance with an embodiment of the invention.

FIG. 8 is a signal diagram of the SMPS 700 in accordance with an embodiment of the invention. As shown in FIG. 8, there is ringing present on the Idrain2 current of the SR MOSFET S2. This current ringing creates a voltage ringing on the drain2 voltage of the SR MOSFET S2 during the secondary stroke, as illustrated by the dotted line 802. However, with the filtering provided by the filtering resistor R2 and the filtering capacitor C4 in the second control circuit IC2-B, the filtered drain2 signal will be delayed. However, because there is a closed loop regulation for the regulation time Treg, the regulation simply adjusts the reference voltage from Vref to Vref_f to compensate, which reduces or eliminates the gate2 voltage ringing. This delay compensation works the same as the compensation for offset in the amplifier AMP2.

FIG. 9 is a process flow diagram of a method of operating an SMPS in accordance with an embodiment of the invention. At block 902, the voltage on a control terminal of an output transistor is regulated according to the voltage on a conduction terminal of the output transistor when the voltage on the conduction terminal reaches a reference level. The output transistor is connected to a winding of a transformer that is connected to an output node. Next, at block 904, a timer is started when the voltage on the conduction terminal of the output transistor reaches the reference voltage. Next, at block 906, the timer is stopped when the current through the output transistor reaches zero. Next, at block 908, a voltage difference between a target voltage and a voltage accumulated is sampled when the timer was active to produce a sampled voltage, which defines a new reference voltage if the accumulated voltage is not equal to the target voltage. Next, at block 910, the starting of the timer, the stopping of the timer and the sampling of the voltage difference are repeated using the new reference voltage so that the reference voltage is adaptively adjusted in accordance with an operational characteristic of the output transistor, e.g., the RdsOn of the output transistor.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A switched mode power supply (SMPS) comprising:
   a transformer with a first winding and a second winding, the first winding being connected to an input node and the second winding connected to an output node;
   an input switch connected to the first winding of the transformer;
   an output transistor connected to the second winding of the transformer; and
   a control circuit connected to the output transistor, the control circuit including:
      a regulator configured to regulate the voltage on a control terminal of the output transistor according to the voltage on a conduction terminal of the output transistor when the voltage on the conduction terminal reaches a reference voltage;
      a timer configured to start when the voltage on the conduction terminal of the output transistor reaches the reference voltage and to stop when the current through the output transistor reaches zero; and
      a sampling circuit connected to the timer, the sampling circuit being configured to sample a voltage difference between a target voltage and a voltage accumulated when the timer was active to produce a sampled voltage, the sampled voltage defining a new reference voltage if the accumulated voltage is not equal to the target voltage,
   wherein the control circuit is configured to operate in cycles using the latest reference voltage so that the reference voltage is adaptively adjusted in accordance with an operational characteristic of the output transistor.

2. The SMPS of claim 1, wherein the control circuit further includes an amplifier that receives the accumulated voltage and the target voltage to produce the voltage difference.

3. The SMPS of claim 2, wherein the control circuit further includes a second amplifier that receives the sampled voltage and a combined voltage of an offset voltage and the voltage on the conduction terminal of the output transistor to determine when the voltage on the conduction terminal of the output transistor reaches the reference voltage.

4. The SMPS of claim 3, wherein the control circuit further comprises a comparator that compares the voltage on the control terminal of the output transistor with a predefined voltage to determine when the voltage on the control terminal of the output transistor drops below the predefined voltage.

5. The SMPS of claim 4, wherein the control circuit further comprises a logic circuit that outputs a control signal in response to an output signal of the comparator to begin sampling the voltage difference between the target voltage and the accumulated voltage.

6. The SMPS of claim 5, wherein the control circuit further comprises a delay timer circuit that delays the output signal of the comparator to produce a delayed signal of the output of the comparator, the delay signal being to stop the sampling of the voltage difference between the target voltage and the accumulated voltage.

7. The SMPS of claim 1, wherein the timer includes a current source and a timer capacitor separated by a switch, which controls the timer.

8. The SMPS of claim 1, wherein the control circuit further comprises a series-connected resistor and capacitor connected to the conduction terminal of the output transistor to filter the voltage on the conduction terminal of the output transistor.

9. The SMPS of claim 1, wherein the output transistor is a metal-oxide-semiconductor field-effect transistor (MOSFET).

10. A method of operating a switched mode power supply (SMPS), the method comprising:
    regulating the voltage on a control terminal of an output transistor according to the voltage on a conduction terminal of the output transistor when the voltage on the conduction terminal reaches a reference voltage, the output transistor being connected to a winding of a transformer that is connected to an output node;
    starting a timer when the voltage on the conduction terminal of the output transistor reaches the reference voltage;
    stopping the timer when the current through the output transistor reaches zero;
    sampling a voltage difference between a target voltage and a voltage accumulated when the timer was active to produce a sampled voltage, the sampled voltage defining a new reference voltage if the accumulated voltage is not equal to the target voltage; and
    repeating the starting of the timer, the stopping of the timer and the sampling of the voltage difference using the new reference voltage so that the reference voltage is adaptively adjusted in accordance with an operational characteristic of the output transistor.

11. The method of claim 10, further comprising receiving the accumulated voltage and the target voltage at an amplifier to produce the voltage difference.

12. The method of claim 11, further comprising receiving the sampled voltage to a combined voltage of an offset voltage and the voltage on the conduction terminal of the output transistor at a second amplifier to determine when the voltage on the conduction terminal of the output transistor reaches the reference voltage.

13. The method of claim 12, further comprising comparing the voltage on the control terminal of the output transistor with a predefined voltage using a comparator to determine when the voltage on the control terminal of the output transistor drops below the predefined voltage.

14. The method of claim 13, further comprising using an output of the comparator to begin the sampling of the voltage difference between the target voltage and the accumulated voltage.

15. The method of claim 14, further comprising delaying the output of the comparator using a delay timer circuit to use a delayed signal of the output of the comparator to stop the sampling of the voltage difference between the target voltage and the accumulated voltage.

16. The method of claim 10, wherein the starting and stopping the timer includes selectively connecting a current source to a timer capacitor using a switch.

17. The method of claim 10, further comprising filtering the voltage on the conduction terminal of the output transistor using a resistor and a capacitor connected in series.

18. A switched mode power supply (SMPS) comprising:
a transformer with a first winding and a second winding, the first winding being connected to an input node and the second winding connected to an output node;
an input transistor connected to the first winding of the transformer;
an output transistor connected to the second winding of the transformer; and
a control circuit connected to the output transistor, the control circuit including:
a regulator configured to regulate the voltage on a control terminal of the output transistor according to the voltage on a conduction terminal of the output transistor when the voltage on the conduction terminal reaches a reference voltage;
a timer configured to start when the voltage on the conduction terminal of the output transistor reaches the reference voltage and to stop when the current through the output transistor reaches zero;
a sampling circuit connected to the timer, the sampling circuit including an amplifier configured to produce a voltage difference between a target voltage and a voltage accumulated when the timer was active, the sampling circuit being configured to sample the voltage difference to produce a sampled voltage, the sampled voltage defining a new reference voltage if the accumulated voltage is not equal to the target voltage,
wherein the control circuit is configured to operate in cycles using the latest reference voltage so that the reference voltage is adaptively adjusted in accordance with an operational characteristic of the transistor.

19. The SMPS of claim 18, wherein the control circuit further includes a second amplifier that receives the sampled voltage and a combined voltage of an offset voltage and the voltage on the conduction terminal of the output transistor to determine when the voltage on the conduction terminal of the transistor reaches the reference voltage.

20. The SMPS of claim 19, wherein the control circuit further comprises a comparator that compares the voltage on the control terminal of the output transistor with a predefined voltage to determine when the voltage on the control terminal of the output transistor drops below the predefined voltage.

* * * * *